Dec. 6, 1955  F. G. EDNELL ET AL  2,725,908
BARKING MACHINES HAVING REVOLVING AND ROTATABLE
CYLINDRICAL BARK-REMOVING TOOLS
Filed June 18, 1954

INVENTOR
FOLKE GEORG EDNELL
TAGE RAGNVALD EDNELL
BY Linton and Linton
ATTORNEYS

United States Patent Office 2,725,908
Patented Dec. 6, 1955

2,725,908

BARKING MACHINES HAVING REVOLVING AND ROTATABLE CYLINDRICAL BARK-REMOVING TOOLS

Folke Georg Ednell, Animskog, and Tage Ragnvald Ednell, Amal, Sweden

Application June 18, 1954, Serial No. 437,639

3 Claims. (Cl. 144—208)

The present invention relates to barking machines of the kind comprising at least one rotatably mounted annular carrier member through the opening of which the work piece is fed and which carries a plurality of oscillatably and rotatably mounted stub shafts or spindles adapted to carry tools serving for the machining of the work piece and associated with resilient means adapted to urge the tools yieldingly into operative engagement with the work piece, and further comprising means for imparting rotational movement to said stub shafts or spindles as the carrier member is being rotated.

The invention has for its object to provide a barking machine of the kind referred to which is structurally simple though efficient in operation.

For the object stated, the inventive barking machine is mainly characterised in that the stub shafts or spindles carrying the substantially cylindrically contoured tools extend transversely relative to the longitudinal direction of the work piece.

One specific embodiment of the invention is illustrated by way of example in the accompanying drawing in which.

Figure 1:
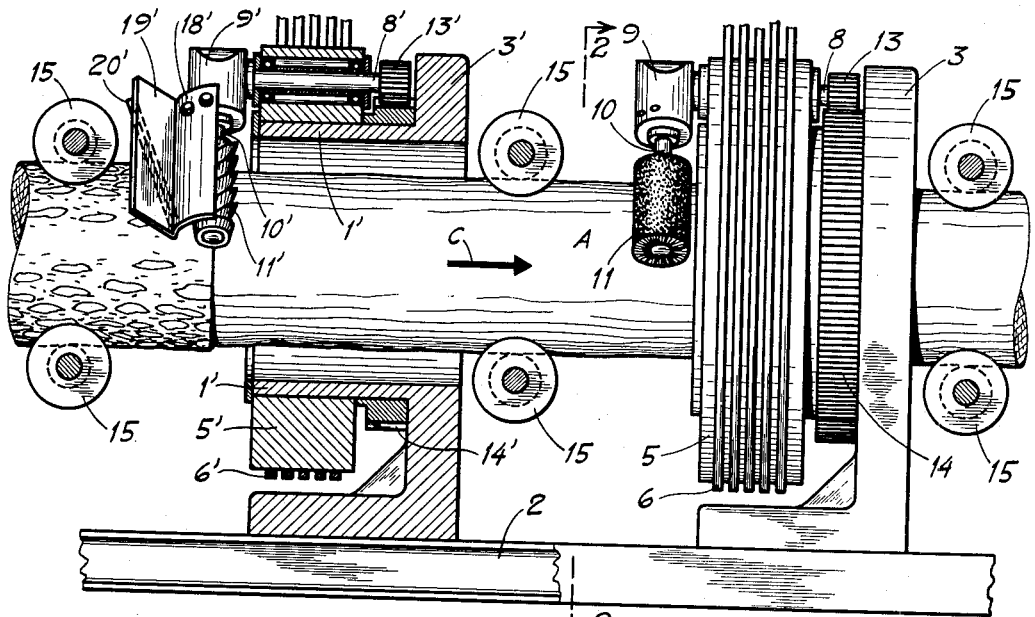
Figure 1 is a side elevational view, partly in vertical section, of a barking machine incorporating the present invention, certain parts being omitted.
Figure 2:
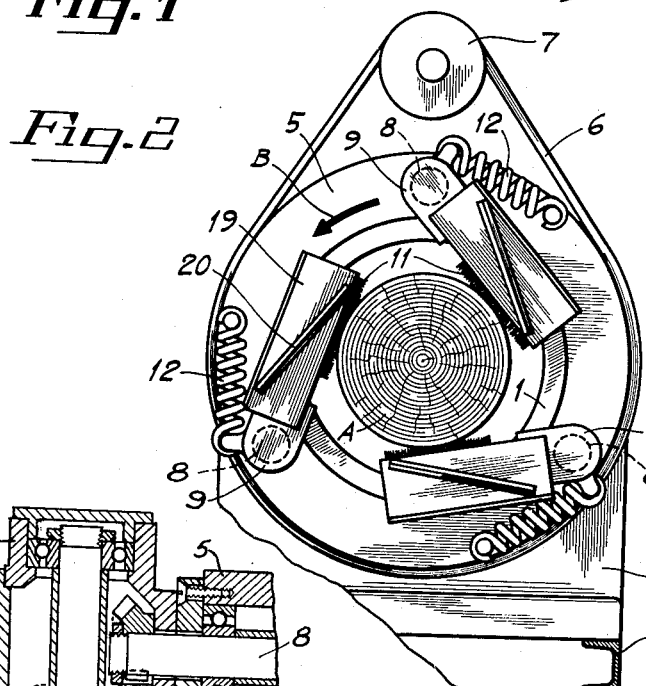
Figure 2 is a cross-section through the machine on the line 2—2 of Figure 1, but includes those parts omitted in Fig. 1.
Figure 4:
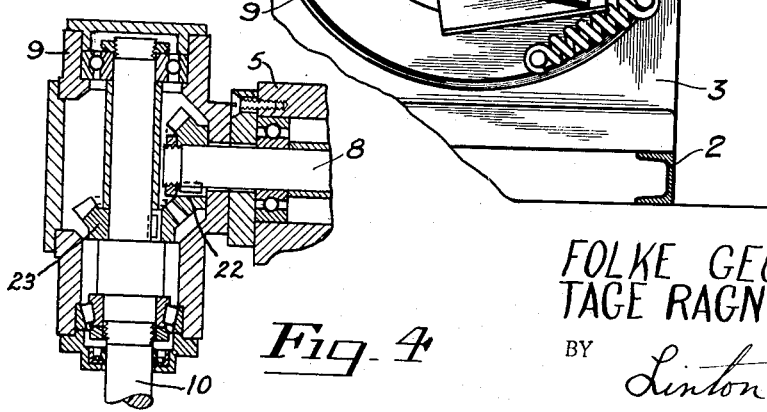
Fig. 4 is an enlarged cross sectional view of the tool head.

Referring now to the drawing, numeral 1 designates an annular carrier member supported from a bed 2 and being in the form of a cylindrical body formed at one end thereof with a flange 3 and having rotatably mounted thereon an annular carrier member 5 adapted to be rotated from a power operated driving member 7 (omitted in Figure 1) through the medium of a number of driving belts 6. The carrier member 5 has rotatably mounted therein three layshafts 8 extending in parallel relation to the axis of rotation of the carrier member and each having pivotally mounted on its end remote from the flange 3 a tool head 9. In each one of the three tool heads 9 a spindle or stub shaft 10 is rotatably mounted at one end so as to extend substantially perpendicularly relative to the respective layshaft 8, said spindle or stub shaft 10 being adapted to carry a steel wire bristled cylindrical scrub brush 11 serving for machining the work piece A. The shafts 8 and 10 are interconnected in pairs by right angle transmission gears 22 and 23 respectively, see Fig. 4, housed within the tool heads 9. The heads 9 are each actuated by coil springs 12 adapted to urge the associated brushes 11 angularly towards the axis of rotation of the carrier member 5. Each one of the layshafts 8 carries at its end remote from the associated tool head 9 a spur gear 13 which engages a ring gear 14 secured to the cylindrical element 1 adjacent to the flange 3 thereof whereby, as the carrier member 5 is rotated in the sense indicated by the arrow B in Figure 2, the brushes 11 will have imparted to them a high speed rotary motion about their respective axes. The stub shafts or spindles 10 are thus adapted to rotate on their own axes and also to oscillate about the axis of their respective layshafts 8, while they extend transversely relative to the longitudinal direction of the work piece. The machine is provided with feed and guiding rollers 15 co-operating with the work piece A to be worked on by the machine.

The brushes 11 are provided exclusively for the purpose of smoothing the work piece which has, in advance, had most of the bark removed from it, and the machine illustrated in the drawing, to initially remove the bark, is provided in advance of the smoothing unit just described, as seen in the direction of feed of the work piece, with a barking unit disposed in tandem relation to the aforesaid smoothing unit, and the structural features of said barking unit are identical with those of the smoothing unit, the various component parts having been designated in the drawing by reference numerals the same as those of the smoothing unit but to which a suffix has been applied (e. g. 1', 3' and so on).

Figure 3:
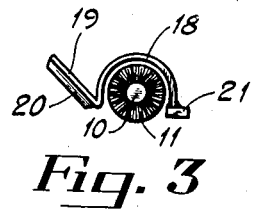
Figure 3 is an end view of one of the brushes incorporated therein.

The barking unit differs from the smoothing unit described hereinbefore in that the tools used in the barking unit are in the form of preferably cylindrically contoured helical cutters 11'. Each one of the tool heads 9' in order to facilitate the introduction of the work piece into the machine, carries a trough-like casing 18' secured thereto at one end so as to extend along the side of the cutter 11' trailwise with respect to the direction of feed of the work piece A, as indicated by the arrow C in Figure 1, and having projecting from its edge nearer to the axis of rotation of the carrier member 1', a substantially rectangular, flat guide plate 19' which is inclined relative to said axis and has disposed on its surface facing the direction of feed of the work piece a diagonally extending rib 20. In the operation of first introducing a work piece into the machine the leading end of the work piece will engage the inclined guide plates 19' and, through a wedging interaction therewith, will rock the cutters in an outward direction causing the same to slip on to the peripheral surface of the work piece. The smoothing unit also is provided with identical guiding devices 18 to 20 (omitted in Figure 1) in which the chute-like casings 18 are provided with abutments 21 (see Figure 3) adapted to engage the work piece A to reduce thereby the contact pressure between the brushes 11 and the work piece.

What we claim is:

1. In a barking machine of the kind comprising at least one rotatably mounted annular carrier member through the opening of which a work piece is fed and which carries a plurality of oscillatably and rotatably mounted stub shafts adapted to carry tools serving for the machining of a work piece and associated with resilient means adapted to urge the tools yieldingly into operative engagement with a work piece, and further comprising means for imparting rotational movement to said stub shafts as the carrier member is being rotated, the improvement which comprises tools each having a substantially cylindrical contour, each tool being mounted coaxially on one of said stub shafts for rotation therewith about an axis that extends transversely relative to the longitudinal direction of a work piece and that lies parallel to a tangent to the peripheral surface of a work piece.

2. An arrangement as claimed in claim 1 in which said tool-carrying stub shafts are each mounted in a head member, said head members being in turn mounted on said carrier member so as to be rockable about respective drive shafts therefor extending in parallel relation to the axis of rotation of the carrier member, and further characterised in that said drive shafts are operatively connected to said tool-carrying shafts by right angle transmissions disposed within said heads.

3. An arrangement as claimed in claim 1 where the machine comprises two co-axially disposed carrier members for said tools, said members being spaced in tandem relation, one behind the other as seen in the direction of feed of a work piece, and further characterized in that the tools of the rearmost carrier member, as seen in the direction of feed of a work piece, are in the form of brushes adapted to smooth the surface of a work piece that has been stripped of the major portion of its bark by the tools of the carrier member disposed in advance of said rearmost carrier member.

References Cited in the file of this patent

UNITED STATES PATENTS

| | | |
|---|---|---|
| 2,646,092 | Kolpe et al. | July 21, 1953 |

FOREIGN PATENTS

| | | |
|---|---|---|
| 24,258 | Sweden | Feb. 29, 1908 |
| 56,059 | Sweden | Feb. 19, 1924 |
| 108,230 | Germany | Jan. 20, 1900 |
| 293,461 | Germany | Aug. 12, 1916 |